Feb. 1, 1927.

W. S. RICHMOND 1,616,230

ELECTRIC SPEED REGULATING APPARATUS

Filed Nov. 3, 1921   3 Sheets-Sheet 1

INVENTOR.
Waldemar S. Richmond.
BY
his ATTORNEY.

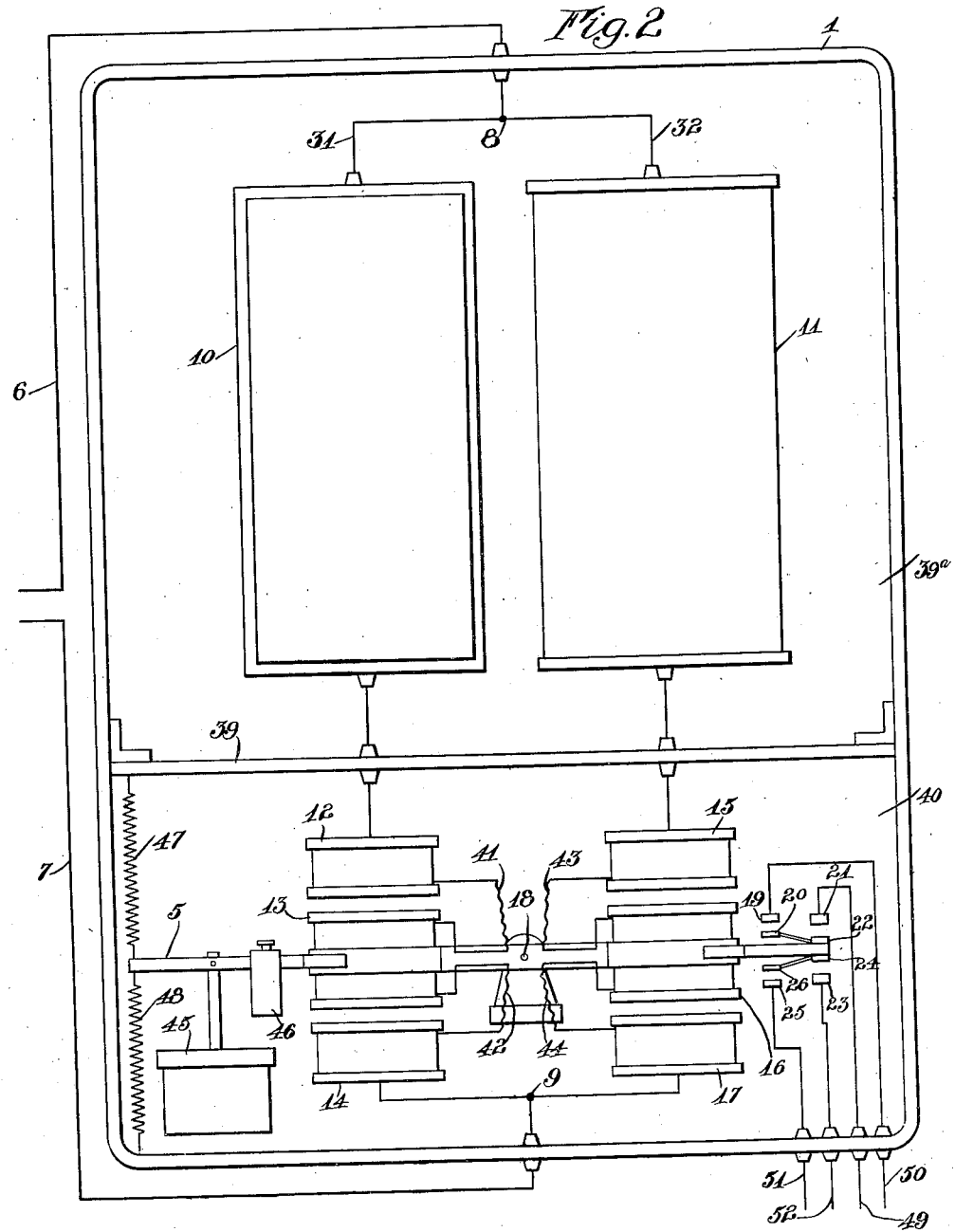

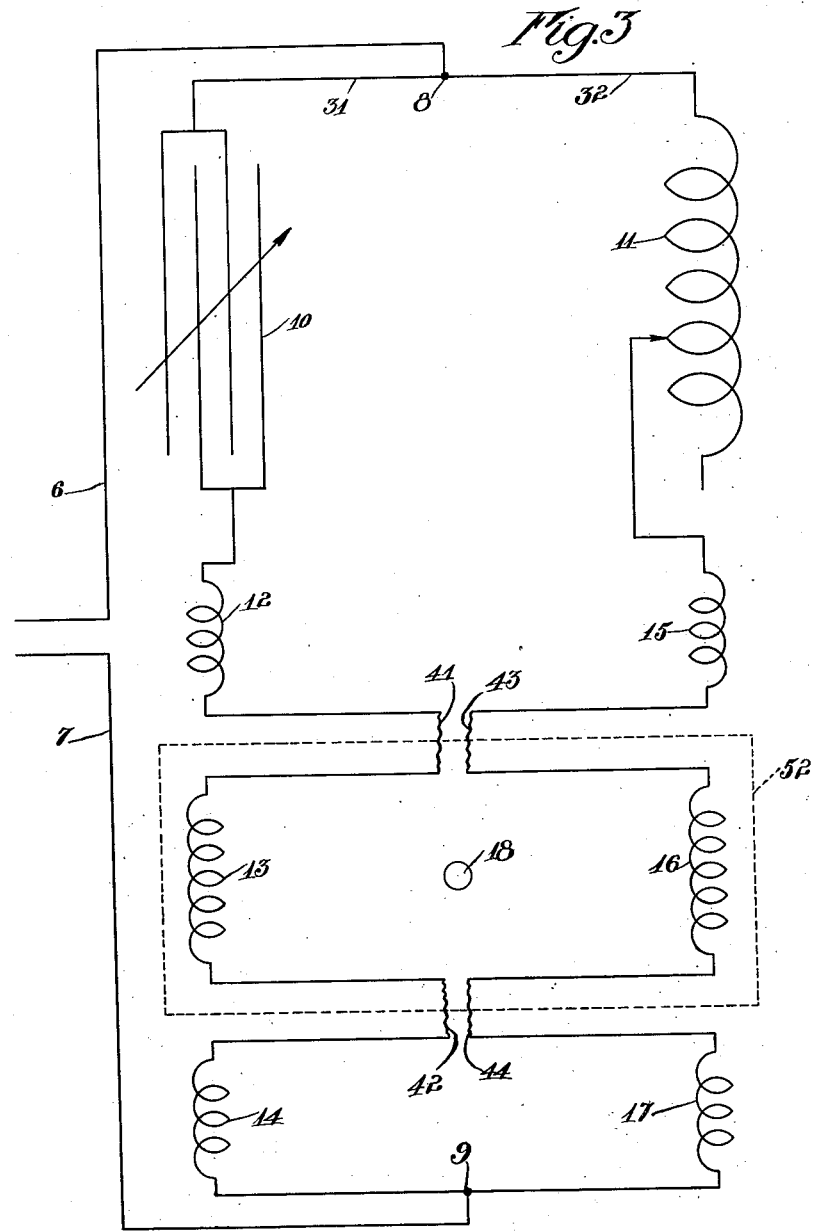

Patented Feb. 1, 1927.

1,616,230

UNITED STATES PATENT OFFICE.

WALDEMAR S. RICHMOND, OF BUFFALO, NEW YORK.

ELECTRIC SPEED-REGULATING APPARATUS.

Application filed November 3, 1921. Serial No. 512,451.

This invention relates to electric speed regulating apparatus and more particularly to apparatus by which changes in the characteristics of the electric energy supplied to a circuit, such, for example, as affect the impedance of the circuit, may be utilized to automatically operate regulating, or governing mechanisms for controlling the speed of prime movers and other machines. One object of the invention is to provide practical and efficient apparatus of this nature applicable to various conditions of use, which consumes but little power, and is sensitive and reliable in operation.

Another object is to provide apparatus of this type particularly adapted for inclusion in a circuit energized by a prime mover, or other motor, for automatically and closely regulating the speed of the latter.

Still a further object is the provision of an effective device, or actuator, responsive to variations in the frequency of an alternating current, for applying energy directly or thru relays in a form capable of maintaining, altering or otherwise governing the speed of prime movers and other machines. To these and other ends the invention resides in certain improvements and combinations of parts all as will hereinafter be more fully described, the novel features being pointed out in the claims at the end of the specification.

In the drawings:

Figure 2 is an enlarged detailed view of parts shown in Figure 1; and

Figure 3 is a diagrammatic view of the electrical connections.

Similar reference numerals throughout the several views indicate the same parts.

Figure 1:
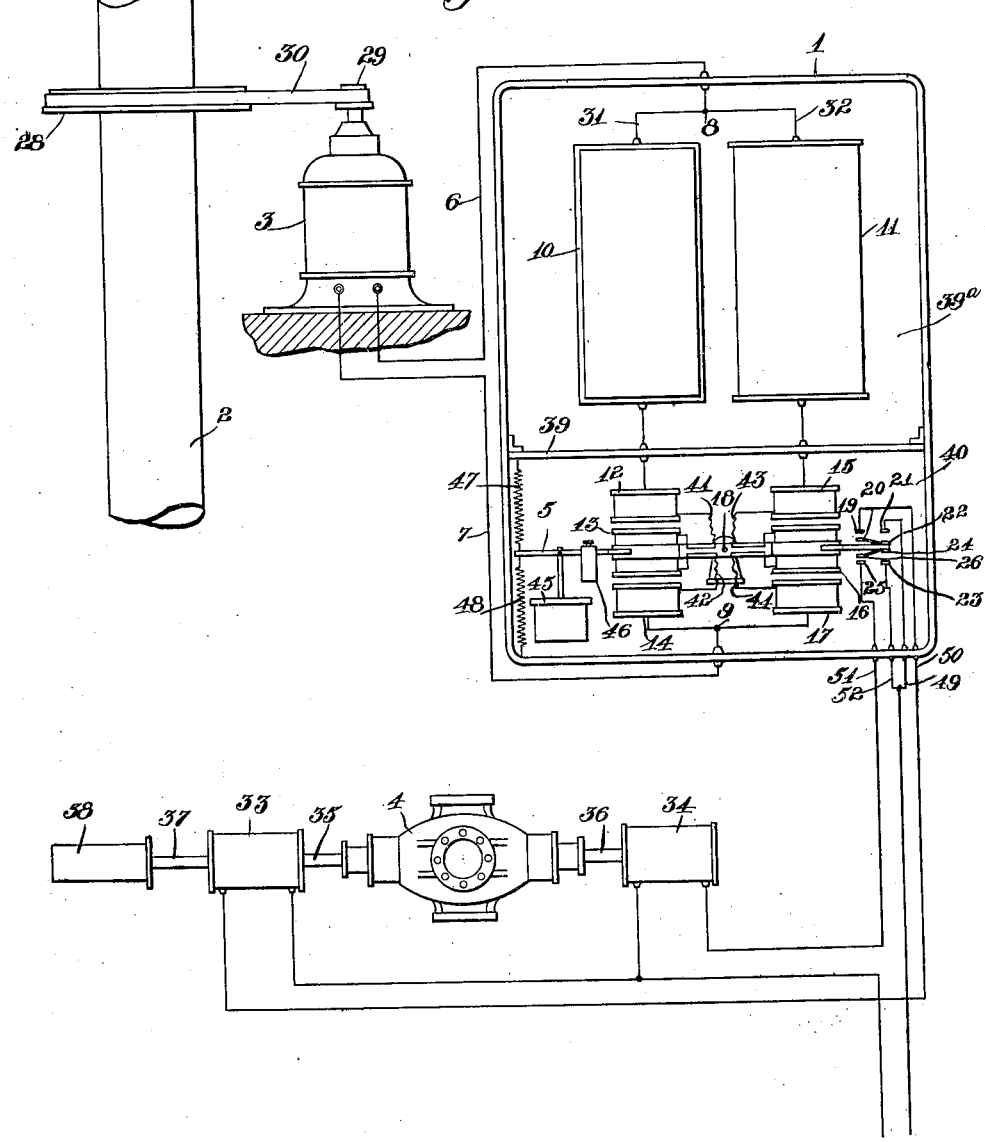
Figure 1 is a general diagrammatic view of apparatus embodying the present invention and illustrating the same as applied to the regulation of the speed of a prime mover.

This invention embodies an electrical principle involving a divided electrical circuit and the unequal variation in strength of alternating electrical current flowing in the various circuit branches under different conditions of voltage and frequency. The physical laws involved are: (1) that the strength of electrical current flowing in a portion of an electrical circuit varies directly in proportion to the voltage impressed across the ends of this portion of the circuit; and (2) that the strength of electrical current flowing in a portion of an electrical circuit varies inversely in proportion to the impedance of this portion of the circuit. The various circuit branches have different impedance characteristics, either as to resistance or reactance, or to both resistance and reactance. Consequently the current strength varies unequally in the different circuit branches as the voltage cycle changes. This inequality in variation of current strength produces the operating forces applied to an actuating device described hereafter. The control of the forces acting upon the mechanism to be regulated or governed is exercised to the extent necessary by this actuating device, either directly or thru one or more relays and auxiliary devices.

Alternating current is employed in the system or circuit, which is preferably but not necessarily single phase. Substantially, sinusoidal voltage and current wave characteristics are preferable. The divided circuit, preferably, though not necessarily, consists of but two branches. One of these branches has a predominating condensive reactance for best conditions of operation, although its condensive reactance may just balance its inductive reactance at some frequency within the range of operating conditions, or there may be a resultant inductive reactance. The other circuit branch has a predominating inductive reactance, which in any case is greater than the resultant inductive reactance of the first circuit branch. For the best results, the resistance in each circuit branch is small and one branch has a resultant condensive reactance of such capacity in relation to the resultant inductive reactance of the other branch, and to the various resistances, as to establish approximately, if not completely, a condition of parallel resonance at the frequency of normal operation.

The embodiment of the invention herein disclosed by way of illustration of the principles involved and a preferred practical application of the same, is illustrated in Figure 1 as comprising a casing 1 in which is housed the actuating device, constituting an electric instrument of moderate size. At 2 is indicated a rotary shaft of a prime mover or other motor the speed of which is to be regulated or governed. At 3 is shown a governor generator driven by belt connection with shaft 2. A pilot valve 4 is illustrated as representing a movable speed controlling means for the machine to be regulated, the valve being moved by solenoids in outside auxiliary circuits which are opened and closed by the operation of a moving part or lever 5 of the actuating device in the casing 1.

The actuating device itself is shown in greater detail in Figure 2, 6 and 7 representing the leads from the generator which enter casing 1 at its top and bottom. The circuit including these leads is divided at 8 and 9 respectively within the casing to form parallel branching circuit portions one of which includes a condenser 10 and the other a main inductance coil 11. At 12, 13 and 14 are inductance coils connected in series with the condenser, while at 15, 16 and 17 are similar inductance coils in series with the main inductance coil 11. Coils 12, 14, 15 and 17 are stationary, while coils 13 and 16 are attached to the ends of the movable part or lever 5 referred to above. The latter is pivotally supported adjacent its center as at 18 and coils 13 and 16 are substantially equidistant from the pivot 18. A series of contacts 19 to 26 inclusive, some of which are fixed on one end of lever 5 and the rest in adjacent cooperative positions, form switches for controlling the two outside solenoid circuits previously referred to as operating the speed controlling pilot valve 4. These switches of course are operated by small rotative movements of lever 5.

The details of construction and functions of the parts are hereafter described, for the sake of convenience, in connection with the present illustrative application of the invention, or in other words, in connection with a generator of the single phase alternating type the voltage characteristics of which approach very closely a perfect sinusoidal wave form and for the case of a generator circuit divided into but two branches one of which is provided with a predominating condensive and the other with a predominating inductive reactance. It is to be understood however that the use of polyphase current, non-sinusoidal voltage, a greater number of branch circuits and other combinations of resistance, inductive reactance and condensive reactance are contemplated as within the scope of the present invention, so that the specific modification shown and described is illustrative but by no means exhaustive.

The generator 3 is in the present instance therefore a single phase machine producing substantially sinusoidal voltage wave form.

The main shaft 2 is provided with a pulley and the generator shaft with a pulley 29 connected to pulley 28 by a belt 30. The generator may thus be separate from the machine to be governed and connected therewith by belt, gears, mechanical or magnetic friction devices, or it may obviously be constructed on the shaft itself or some other portion of the machine to be governed. The generator may be a magneto, or it may be a small alternator, either separately excited from an external source, or self excited from its own connected or built-in exciter, any of which constructions will, if involving alternating current answer the desired purpose.

The leads from the generator to the actuating device in casing 1 may be short or long as necessity or convenience requires. They should be of sufficiently ample conductivity to keep the resistance low. These leads together with the armature windings of the generator customarily constitute all of the main circuit outside of the actuating device.

The branching portions of the main circuit are preferably wholly within the actuating device and form parts thereof, the less inductive branch being designated at 31 as including the condenser 10, and the more inductive branch being shown at 32 as including the inductance coil 11.

The characteristics of the system are so adjusted that when the machine to be governed is operating at normal speed, the balanced arm 5 of the actuating device remains in its neutral or middle position. At increased speed of the machine to be governed, this arm rotates slightly about its pivot to a new position, and at decreased speed it rotates similarly in the other direction, in the first case closing one outside or auxiliary circuit and in the latter case closing another outside or auxiliary circuit. In other words the actuator itself is preferably a relay, operating independent outside electrical circuits, rather than directly operating valves, clutches or other speed controlling means. These outside circuits are preferably energized with direct current and they in turn operate the speed controlling mechanism such as a valve, clutch or similar device. These outside circuits are shown as including two solenoids 33 and 34 having iron plungers 35 and 36 respectively, forming parts of the valve spindle of a hydraulic pilot valve 4. Energization of one solenoid moves the spindle in one direction, while energization of the other moves the spindle in the other direction. The valve spindle is preferably provided with a non-magnetic extension 37 connected with a dash pot 38 for cushioning the movements of the valve.

The coils 12, 13 and 14 are connected in series with each other and with the condenser 10. Similarly the coils 15, 16 and 17 are connected in series with each other and with the main inductance coil 11. Each of these coils 12 to 17 inclusive is inductively wound. Casing 1 is provided with an iron diaphragm 39 separating it into two compartments, 39a and 40, the former containing the condenser 10 and main inductance coil 11, while the latter contains the inductance coils 12 to 17. This diaphragm intercepts to a large extent stray magnetic fields about the inductance coil 11 which might influence the mechanism in compartment 40.

A flexible or other suitable connection 41 near the pivot 18 of arm 5 forms a conductor joining coils 12 and 13 in such a manner that the mechanical resistance of this connection to the pivotal movement of the arm is negligible. Similar connections 42, 43 and 44 join the other coils of the series in their respective relations.

Contacts 19 to 22 inclusive form a switch controlling one of the outside auxiliary circuits, while contacts 23 to 26 inclusive form a switch controlling the other outside circuit. Contacts 19, 21, 23 and 25 are preferably stationary while contacts 20 and 22 are connected with each other and fixed to one side of lever 5. Similarly contacts 24 and 26 are connected and fixed on the opposite side of the lever, so that a small movement of the latter in one direction or the other serves to close the corresponding outside circuit.

A dash pot 45 is preferably provided and connected to lever 5 to cushion its movements and an adjustable weight 46 is also movably carried by the lever for balancing the same. Springs 47 and 48 are fixed to the casing and to respective sides of lever 5 tending to hold the same yieldably in neutral position when the frequency of the current alternations in the generator circuit is normal. In this position, of course, the switches controlling the outside circuits are both open. The arrangement is such that springs 47 and 48 tend to open the switches and hold them open when the frequency of the generator current is normal. The leads connecting the switches with the solenoids 33 and 34 of the pilot valve and also with the outside source of auxiliary current are indicated at 49 to 52 inclusive.

The wiring diagram of the actuating device is illustrated in Figure 3 where coils 13 and 16 of the pivoted lever 5, together with their connections, are enclosed within the broken line 52. The condenser 10 and the inductance coil 11 are shown as constructed for regulating adjustment. It is desirable that one or both should be adjustable in order to readily attune the apparatus to the desired condition of approximate parallel resonance for the normal frequency. Ordinarily stationary coil 12 is similar to stationary coil 15, that is, the windings of the two coils are parallel. The same is true as to stationary coils 14 and 17. Coil 14 is ordinarily similar to coil 12 but wound in the opposite direction to give an opposite effect. A similar relation exists between coils 15 and 17. Coils 13 and 16 ordinarily are similar and have parallel windings to give parallel effects. Coil 14 is shown as having the same number of turns as coil 12 while coil 13 has more turns than either 12 or 14 and as stated these three coils 12, 13 and 14 are connected in series. It is evident that a current passed thru these coils causes attraction between coils 13 and 14, and repulsion between coils 12 and 13. When coil 13 is midway between coils 12 and 14 the two effects are substantially equal. Coils 12 and 14 being stationary and coil 13 movable, the result of passing a current thru these coils is a movement of coil 13 away from coil 12 and toward coil 14, unless some equal and opposite force is applied to coil 13 to prevent it from moving. As coil 13 moves toward coil 14 the effective attraction between these coils increases and the effective repulsion between 12 and 13 decreases. The forces of attraction and repulsion vary inversely as the squares of the effective distances between the coils. The slight gain in total force tending to propel coil 13 as it moves from this position toward coil 14 is sufficiently counteracted by the increased tension in spring 47.

The action of coils 15, 16 and 17 is the same as explained for coils 12, 13 and 14. The particular arrangement of these windings is not essential but merely illustrates one simple and effective construction.

It is apparent that current thru circuit portion 31 tends to move coil 13 toward coil 14 and that a current thru circuit portion 32 tends to move coil 16 toward coil 17. Since however the windings of the coils are equal and lever 5 is balanced, equal currents in the circuit branches 31 and 32 cause effects neutralizing each other and leaving lever 5 in neutral position under the positioning influence of springs 47 and 48 in which position the switches of the outside auxiliary circuits are open. If current in branch 31 becomes greater than in branch 32 coil 13 will be urged toward coil 14 with greater force than coil 16 is urged toward coil 17 and lever 5 will be swung on its pivot to close switch contacts 19 to 22 inclusive. A current is thus set up in the outside auxiliary circuit comprising the leads 49 and 50. Similarly if the current in branch 32 becomes greater than in branch 31, lever 5 will be swung in the opposite direction so as to close contacts 23 to 26 inclusive and set up a current in the outside circuit comprising leads 51 and 52.

The flow of current in each branch of the main circuit is in accordance with the formula $$I = \frac{E}{\sqrt{R^2 + \left(2\pi fL - \frac{1}{2\pi fC}\right)^2}},$$

where
I is the current in amperes;
E is the impressed potential difference between the points 8 and 9, in volts;
R is the resistance of the circuit branch in ohms;
L is the inductance in henrys;
C is the capacitance in farads;
$f$ is the frequency in cycles per second; and $\pi$ is the ratio of the length of the circumference of a circle to the length of its diameter.

This formula is merely a convenient mathematical statement of the two fundamental electrical laws heretofore referred to; namely (1) that the current of electricity flowing in a circuit varies directly as the impressed voltage; and, (2) that the current of electricity flowing in a circuit varies inversely as the impedance. The two elements of impedance, namely resistance and reactance, are represented respectively by R and $$2\pi fL - \frac{1}{2\pi fC}.$$

In the expression for reactance, $2\pi fL$ is the inductive reactance and $$\frac{1}{2\pi fC}$$

is the condensive reactance. The condensive reactance is in opposition to the inductive reactance, as indicated by the minus sign. The resultant reactance is in quadrature with the resistance for impressed voltage of sine wave form, hence the impedance is equal to the square root of the sum of the squares of the resistance and reactance, as indicated in the mathematical expression given for the value of the current 1. The expression applies to root-mean-square, or effective average, values, and to sinusoidal voltage waves.

From the above mathematics it is apparent that, for a given impressed voltage, the current in a circuit branch changes with the frequency of the voltage cycle. If there is inductive reactance in the circuit this will increase with increased frequency, that is, the term $2\pi fL$ becomes larger as its factor $f$ increases. This tends to make the resultant impedance greater and the current less. If the circuit contains condensive reactance, which is the reciprocal of the capacitance $2\pi fC$, then the capacitance will increase, and the condensive reactance decrease as the frequency increases; that is, the expression $$\frac{1}{2\pi fC}$$

becomes smaller in value as $f$ increases in value. If the circuit contains both inductive and condensive reactance, each will have its proportionate effect, and the resultant will depend on the relative magnitudes of L and C. Thus the expression $$\left(2\pi fL - \frac{1}{2\pi fC}\right)$$

becomes larger in value for the increased values of $f$ if C is greater than $$\frac{1}{4\pi^2 f^2 L},$$

but becomes smaller algebraically in value for increased values of $f$ if C is less than $$\frac{1}{4\pi^2 f^2 L},$$

for all values of $f$ involved. If $$2\pi fL - \frac{1}{2\pi fC} = 0$$

in either branch circuit, a condition of series resonance would be established in that circuit branch. This condition should ordinarily be avoided because of the high local voltages involved.

If the condensive reactance in circuit branch 31 is made very large compared to the inductive reactance and the resistance, the value of the current approaches the limiting case $$I = \frac{E}{\sqrt{\left(-\frac{1}{2\pi fC}\right)^2}} = 2\pi fCE.$$

In this limiting case the current increases in direct proportion to the frequency. Similarly if in circuit branch 32 the inductive reactance is very large in comparison with the condensive reactance and resistance, the value of the current approaches the limiting case $$I = \frac{E}{\sqrt{(2\pi fL)^2}} = \frac{E}{2\pi fL}.$$

In this case the current increases in direct proportion to the decrease of the frequency.

For the successful operation of the actuating device it is necessary only that the impedances of the two circuit branches be such that one will change more than the other with change of frequency. For the best results however the inductive reactance in coils 12 to 17 inclusive should be as low as is consistent with the production of sufficient electro-magnetism to operate the movable part or lever 5 properly. The resistances in both circuit branches and in the main circuit supplying them should be low also. The inductive reactance in circuit branch 32 should be large compared to the resistance and to the inductive reactance of the coils 15, 16 and 17 of the same branch. The circuit branch 31 should, for the best results, have a condensive reactance, represented by the condenser 10, and the condensive reactance of this circuit branch should be considerably greater than the resistance in this branch and also considerably greater than the inductive reactance of the coils 12, 13 and 14 of the same branch; and in fact should be of such magnitude in comparison with other elements of the two circuit branches as to make the impedances in the branches 31 and 32 equal for the normal frequency, where coil 12 is similar to coil 15, coil 13 is similar to coil 16 and coil 14 is similar to coil 17. In any case the various elements in the two circuit branches will be such as to hold lever 5 in neutral position at normal frequency. Under these conditions an increase in frequency will cause more current to flow in branch 31 and less in branch 32 while a decrease in frequency will cause less current to flow in branch 31 and more in branch 32.

For the case explained in the preceding paragraph there will be a condition of approximate parallel resonance at normal operating frequencies. In any case the voltage in the main circuit need be moderate only, and the current small, representing the consumption of very little power. Of course the voltage as well as the frequency will change with the speed of rotation of the machine to be governed, but the voltage has equal effects on both circuit branches of the actuating device.

The operation of the apparatus has been explained in connection with the description of its construction and may be summed up briefly as follows: With the parts constructed, arranged and adjusted as already described, the machine whose speed is to be governed represented by the main shaft 2, drives the small alternator 3 which energizes the connected circuit. At normal speed the movable element of the actuating device, or lever 5, remains in neutral position due to the balanced condition of the force acting upon it. At increased speed of the machine to be governed, generator 3, is driven at correspondingly increased speed which increases the frequency of the voltage cycle of the generator. Due to the differences in inductive properties of the branches of the circuit, the division of current between them is changed and the movable element is operated in the corresponding direction. At decreased speed of the machine to be governed the opposite effect is produced. The movable element preferably operates as a relay, connecting auxiliary circuits to do the work necessary for regulating the speed of the machine to be governed, as for example, opening and closing the pilot valve 4 controlling the latter.

I claim as my invention:

1. A speed regulating apparatus comprising a movable regulating part, an electric circuit including parallel branching portions one of which is provided with inductive reactance and another of which is provided with condensive reactance, actuating inductance coils in said circuit portions, a movable device actuated conjointly by said inductance coils, switch means controlled by said device, and relay circuit means controlled by said switch means and including means for moving said regulating part.

2. In electric speed regulating apparatus, an electric circuit having parallel branching portions, one of which is provided with inductive reactance and another of which is provided with condensive reactance, means for energizing said circuit by alternating current whose frequency varies with the speed of the regulated device, said circuit including a single movable regulating part actuated by said circuit portions and devices actuated by said parts for effecting regulation of the speed of the regulated device.

WALDEMAR S. RICHMOND.